United States Patent [19]

Niehaus

[11] 3,882,269

[45] May 6, 1975

[54] APPARATUS, SYSTEM AND METHOD OF STORING A STATIC IMAGE DISPLAYED ON A TELEVISION TUBE

[75] Inventor: William R. Niehaus, Cincinnati, Ohio

[73] Assignee: The E. W. Scripps Company, Cincinnati, Ohio

[22] Filed: May 11, 1973

[21] Appl. No.: 359,344

[52] U.S. Cl... 178/6.6 R; 178/DIG. 13; 340/173 LS
[51] Int. Cl......................... G11b 31/00; G11c 11/42
[58] Field of Search........... 178/7.4, DIG. 13, 6.6 R, 178/6.7 A; 340/173 LS; 325/308; 95/11 R

[56] References Cited

UNITED STATES PATENTS

| | | | |
|---|---|---|---|
| 1,222,310 | 4/1917 | Lichtman | 95/11 R |
| 2,912,592 | 11/1959 | Mayer | 340/173 LS |
| 3,229,261 | 1/1966 | Fatuzzo | 340/173 LS |
| 3,576,546 | 4/1971 | Heyman | 340/173 LS |
| 3,659,270 | 4/1972 | Maldonado | 178/6.6 R |
| 3,740,734 | 6/1973 | Maldonado | 340/173 LS |
| 3,746,780 | 7/1973 | Stetten | 178/DIG. 13 |

OTHER PUBLICATIONS

Proceedings of the IEEE - Cable TV - July 1970; by R. P. Gabriel; p. 1023.

Spectrum - "Two Way Applications For Cable TV Systems in the 70's;" Nov. 1971; by R. K. Jurgen; p. 51.

*Primary Examiner*—Bernard Konick
*Assistant Examiner*—Alan Faber
*Attorney, Agent, or Firm*—Meyer, Tilberry & Body

[57] ABSTRACT

An apparatus, system and method for storing a static image onto a generally flat plate formed from a layer of ceramic material capable of forming an image when concurrently exposed to an electro-magnetic field and a light image. The apparatus, system and method includes means for positioning the plate in a position exposed to the image surface of a television tube, means for exposing the flat plate to a generally uniform light source while concurrently subjected to an electro-magnetic field, means for creating a selected image on the image surface of the television tube at least for a given time, and means for subjecting the flat plate to an electro-magnetic field while exposed to the selected image on the tube. In this manner, the static image on the tube is transferred to the flat plate for subsequent viewing.

16 Claims, 13 Drawing Figures

APPARATUS, SYSTEM AND METHOD OF STORING A STATIC IMAGE DISPLAYED ON A TELEVISION TUBE

This invention relates to the art of creating an image on a flat ceramic plate and more particularly to an apparatus, system and method for storing a static image displayed upon a somewhat standard television tube.

The invention is particularly applicable for transmitting a static image to a somewhat standard television receiver by a broadband communication network, such as a CATV system, and transferring this static image to a flat plate for subsequent viewing. The invention will be discribed with particular reference to such a system; however, it is appreciated that the invention has much broader applications and may be used in other broadband communication networks.

In recent years, advancements in the CATV technology have made many channels available for transmission use. Also, it is now required that a station must provide as many as 20 separate transmission channels to obtain a license for operation. At the present time, it is not economical to transmit normal television programming on all available cable channels. Consequently, much effort is being directed toward use of the broadband networks for purposes other than normal programming. Additional uses for available channels are even more necessary in areas where dual cable systems are anticipated having upwards of 60 broadband channels available to a station. To use these channels, it has been suggested that requested information, or pertinent news, could be transmitted on certain channels of the CATV system for reception by the subscribers. At the present time, simple systems are in existence wherein the head end of the CATV system sets aside a given channel for visually displaying news, weather and similar information. This information is scanned and transmitted on the selected channel to subscribers. By selecting the proper channel, a subscriber can view the scanned information. The disadvantage of this type of information transmitting system is obvious. A channel is occupied even though subscribers require the information for a very short time. In addition, the information being transmitted at a given time may be of no interest to certain subscribers. Using this type system, even when a large number of channels are available for transmitting non-programming information, the amount and type of information transmitted would be of somewhat limited use to the subscribers. In addition, the information would be periodically changed so that a subscriber could not view information after it had been cycled from the head end transmission. Consequently, efforts have been made to adopt a system wherein given information may be retained on the image display surface of the television tube for a selection time to allow a subscriber access to this information. To accomplish this function, a memory unit is located at the television set to memorize an image which has been transmitted from the head end station. Then a channel on the receiver is used to view the memorized image. To do this, the image must be static for a time needed to load the memory and a subscriber must know when a particular static image will be displayed. The memory unit is a fairly costly component, and the lack of versatility of such a system has made this proposal unacceptable.

The difficulties mentioned above are compounded when the information transmitted on a given channel is to be specifically requested by the subscriber. Systems allowing a subscriber to request specific information are now in the development stage. These systems generally involve a device available to the subscriber for requesting certain information. When a subscriber requests information, the information will be selected from an information bank at the head end of a CATV system and transmitted on a given channel to the subscriber's receiver. The information bank could include many volumes of literature normally found in a library, an encyclopedia, the current newspaper, mathematical tables, formulae and similar reference material. The most apparent problem encountered in developing this type of information retrieval system for a broadband CATV system is that the requested information would occupy a channel for a fairly long time. This somewhat limits the number of separate information items which can be transmitted to the various subscribers.

To increase the capabilities for transmitting requested information to a subscriber, a memory unit could be attached to the subscriber's receiver. In this manner, the information could be transmitted for a very short time on the cable. The memory unit would remember the information and hold the memorized information on the display screen for a time longer than the transmitting time. This would release the cable to service another subscriber. However, the memory devices are expensive and occupy the receiver during the total receiving time. The present invention relates to an apparauts, system and method for overcoming the difficulties experienced in attempting to use a broadband communication network, such as CATV system, for transmitting requested information to selected subscribers of the television system. In accordance with the invention, the system includes an attachment for the television receiver which includes a flat plate formed from a layer of ceramic material capable of forming an image when concurrently subjected to an electro-magnetic field and a light image. By providing an attachment such as this, the flat plate may be positioned in front of the television receiver, and the subscriber can request selected information by communication with the head end. After identifying the customer, the head end transmits the information to the subscriber on a selected channel. With the ceramic flat plate positioned in front of the receiver, the receiver will display the requested information as a static image for a relatively short time, such as 30–60 second. During this time, the image is transferred to the ceramic plate, which is subjected to an electro-magnetic field. After this relatively short time, the channel used by the subscriber is free to transmit requested information to another subscriber. Consequently, the channel is occupied for only a short period for each piece of requested information. An electronic memory unit is not needed.

The flat plate can be erased by subjecting the plate to a uniform light source and an electro-magnetic field. Consequently, whenever the requested information is no longer required, the plate can be conditioned for receiving subsequent information by erasing the prior image. A number of image plates may be used for storing several requested static images from the head end transmitter. By using this system, newspapers can be distributed by the television channel. To accomplish this, all subscribers receive the news through a television receiver and store the news on the image plate or plates.

It is possible to use the apparatus, system and method to which the present invention is directed in broadband communication networks other than a CATV system. The term "broadband" is well known in the communication field and defines a network having a band width greater than about 4,000 Hertz. A broadband system using the present invention includes a television receiver which is driven by the broadband network to provide a static image on the television tube for a time necessary to set the image in the ceramic image plate. After this, the television receiver can be used for normal programs from the broadband network. The invention is particularly applicable to a CATV broadband network because such networks are now operating with subscribers and with sufficient technology to provide means for requesting information and taking action upon the information requested. Also, a cable interconnected system provides appropriate equipment for identifying and billing subscribers requesting specific information. When television programs are transmitted through local antennas, requested information would probably require scramblers and unscramblers. This would add to the total cost of a system for transmitting requested information to a particular subscriber. For these reasons the present invention is described for use in a CATV network which can incorporate the present invention without drastic modification in its normal operating procedures and its transmitting techniques.

In accordance with other aspects of the invention, a request for information can be accompanied by a distinctive customer code so that the requested information can pass only to the receiver of the requesting subscriber. It is also within the contemplation of the present invention to provide means for advising the requesting subscriber that there is no channel available for transmitting requested information. In this event, the information is requested later by the subscriber or there is provided means for queuing the request, for transmission as soon as an information channel is available. By providing a multiple group of information channels, three to five, a substantial number of requests could be processed. The number of channels used for this information requesting network would be determined by the average number of requests so that a requesting subscriber would not experience long delays before receiving requested information. All of these considerations are design considerations which can be adopted for use in practicing the present invention but which do not form a necessary part thereof.

In accordance with the preferred embodiment of the invention, the flat image storing ceramic plate uses the longitudinal electro-optic scattering effect found in coarse-grained (grain size $<3\mu$) rhombohedral-phase lead-lanthanum-zirconate-titanate (PLZT) ceramics. In plates of these ceramic materials poled normal to the major surfaces, incident light is multiply scattered as it is transmitted, and the intensity of scattered light depends on the ferroelectric remanent polarization state of the plate. This longitudinal electro-optic scattering effect is used in the plate which can be generally defined as a ferroelectric-photoconductor (FE-PC) device that is capable of storing photographic images with reasonable high resolution and good gray scale. The basic flat plate used in practicing the present invention is a conventional four-layer FE-PC structure consisting of a coarse-grained PLZT ferroelectric ceramic layer and a photoconductive film between two transparent electrodes. The preferred embodiment of this structure utilizes a polyvinyl carbazole (PVK) photoconductive film and tin oxide-doped indium oxide ($In_2O_3$) transparent electrodes. Image storage is achieved by spatial variation of the light scattering in the ceramic layer which is accomplished by concurrently subjecting the plate to an image and a voltage across the electrodes. The polarity of the voltage determines the orientation of the domains in the ceramic layer which can produce a positive or negative reproduction of the image.

Other types of ceramic FE-PC device can be used for the flat image storage plate. These devices use either fine-grained lead zirconate titanate or PLZT ferroelectric ceramics as image-storage media. Images are stored as a spatial variation of birefringence which used polarized narrow-spectral-bandwidth light for viewing or projection. In these other devices a preferred orientation of the ferroelectric polarization is established in the plane of the ceramic layer prior to image storage by using either a transverse electric field or a uniform tensile or compressive strain bias.

In summary, the flat storing plate, in accordance with the preferred embodiment of the invention, includes a PLZT ceramic layer having a thin photoconductive film applied to one surface and sandwiched between two transparent electrodes. To use the electro-optic effect, the ceramic is first exposed to a uniform field of light while, at the same time, a voltage is applied across the photoconductor film and the ceramic layer utilizing the spaced, transparent electrodes. This aligns the photo-electric domains of the ceramic layer in a common direction. When storing an image on the flat plate, the voltage is again applied to the electrodes while the photoconductive film is exposed to the desired image. The degree of light falling at various positions on the ceramic layer and photoconductive film combination changes the alignment of the photo-domains in the ceramic layer in proportion to the amount of light falling on the surface while the electrodes are subjected to a voltage. This records or stores the image in the ceramic layer. After exposure to the image and electro-magnetic field has been removed, the image on the ceramic layer can be viewed, either directly or by projection, by passing light through the ceramic layer. The light is scattered more by the switched domain, with shades of gray being controlled largely by the degree of domain switching within the ceramic layer. When the ceramic is again prepoled by subjecting the ceramic layer to a uniform light source and applying a voltage to the electrodes, the photo-electric domains are again aligned and the image is erased from the ceramic layer.

The primary object of the present invention is the provision of an apparatus, system and method of storing a static image appearing on the image display surface of a television tube, which apparatus, system and method can be used with a broadband communication network for transmitting a static image to the surface.

Another object of the present invention is the provision of an apparatus, system and method, of the type described above, which uses a generally flat image storage plate formed from a layer of ceramic that can store an image when subjected concurrently to the image and an electro-magnetic field.

Another object of the present invention is the provision of an apparatus, system and method as defined above which has an indefinite storage capability while not requiring a prolonged transmission time to television tube.

Another object of the present invention is the provision of an apparatus, system and method, as defined above, wherein the apparatus for storing the static image and its auxiliary equipment can be stored in an inconspicuous position to allow general, normal use of the television receiver.

Yet another object of the present invention is the provision of an apparatus, system and method, as defined above, which requires a minimum amount of space at the television receiver.

Another object of the invention is the provision of an apparatus, system and method, as described above, which does not require an electronic memory unit at the television receiver for storing the static image transmitted to a television receiver.

Still a further object of the present invention is the provision of an apparatus, system and method, as defined above, which includes provision for activating a selected television receiver for receiving requested information.

Still a further object of the present invention is the provision of an apparatus, system and method of storing a static image appearing on the image display surface of a television tube, which apparatus, system and method automatically prepares the image storing device for receiving requested information and then activates the device to store the requested information.

These and other objects and advantages will become apparent from the following description taken together with the accompanying drawings in which.

Figures 1, 1A:
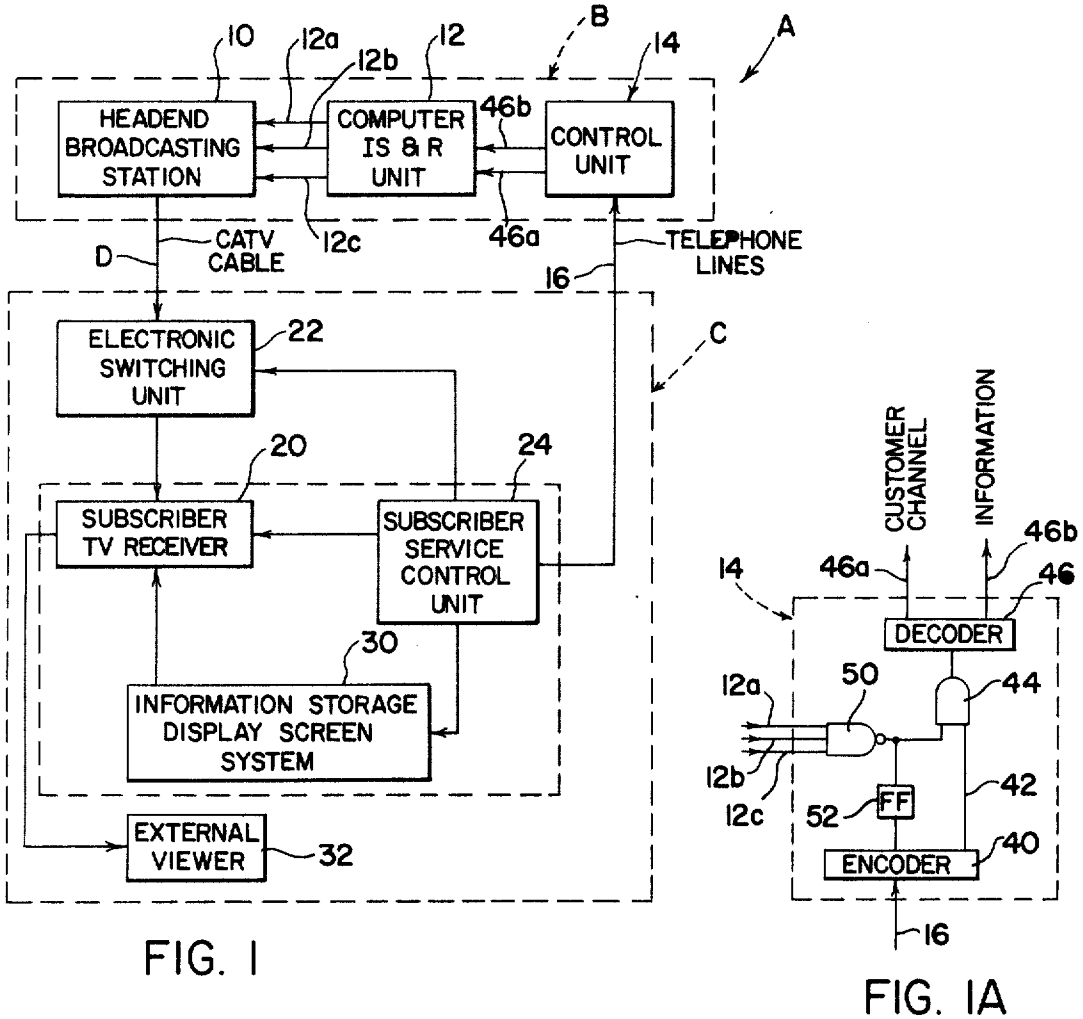
FIG. 1 is a block diagram illustrating the total system incorporated in the preferred embodiment of the present invention.
FIG. 1A is a partial logic diagram illustrating one aspect of the illustrated embodiment of the invention.

Referring now to the drawings wherein the showings are for the purpose of illustrating a preferred embodiment of the invention only, and not for the purpose of limiting same, FIG. 1 shows a combined flow and block diagram schematically illustrating the general system employed in practicing the preferred embodiment of the invention. The CATV system A includes, as basic elements, the head end station B, a subscriber station C, many of which are contemplated, and a cable D connecting the head end to the subscriber station. In accordance with the design of system A several channels can be transmitting concurrently through the cable D and received selectively by the subscriber station C. In accordance with the illustrated embodiment, the head end station B includes a head end transmitting station 10 of somewhat standard construction. A computer controlled information storage and retrieval unit or bank 12 is connected to the head end of broadcasting or transmitting station 10 by a plurality of information lines 12*a*, 12*b*, and 12*c*, each of which controls a separate channel within the transmitting or broadcasting station 10. A control unit 14 controls the computer unit 12, in a manner which will be described later, upon receipt of request for information on line 16. This control line 16 may be telephone wires, a channel in cable D or other appropriate means for connecting the subscriber station to the head end for the request of information from the subscriber. The request may be by voice in a less sophisticated system; however, in accordance with the illustrated embodiment, the line 16 is telephone wires and receives tone codes from the subscriber to identify the subscriber, or customer, and the information desired.

The subscriber station C includes a somewhat standard television receiver 20, a switching unit 22 which allows signals from cable D to be directed, selectively, to the input of receiver 20 in accordance with control from the subscriber service control unit 24. This unit also provides necessary equipment for coding information transmitted to the head end B through connecting line 16.

Positioned at the subscriber station is an information storage and display screen system, the operation of which and the control of which forms a major portion of the preferred embodiment of the invention. To view information transmitted on the head end upon receipt of a request through control line 16 there is provided an external viewing system 32 which may take a variety of forms, one of which is explained later.

Referring now more particularly to FIG. 1A, this figure is a somewhat schematic diagram of one type of control unit 14 which may be employed at the head end. In accordance with this general description, the control line 16 having customer code and an information request transmitted thereon is connected to an encoder 40, which converts the customer code and information request into digital information in pulse form at line 42. This line is connected to the input of an AND gate 44 having an output connected to a decoder 46. Lines 46*a*, 46*b* are the output lines for the decoder. During normal operation, the requested information in line 16 is coded by encoder 40 to identify the requesting customer and the information requested. This, under normal circumstances, is transmitted through line 42, AND gate 44 to the decoder 46. The digital information is divided into a customer code in line 46*a* and an information code in line 46*b*. These two lines, as shown in FIG. 1, are connected to the computer unit 12 which produces the requested information and customer identification code in one of the lines 12*a*, 12*b* or 12*c*. This code and information is then communicated to the head end transmitting station 10 for transmission of the information to the particular channel of cable D controlled by one of lines 12*a*–12*c*. If all information transmitting channels, three of which are illustrated, are being used when a request is received through line 16, a busy signal is transmitted back to the subscriber through a means, such as the incoming control line 16. To accomplish this, various structures can be used. These structures are schematically illustrated in FIG. 1A as a NAND gate 50 having inputs corresponding to lines 12*a*, 12 b and 12*c*. If any one of these lines is not being used, representing the existence of an available channel, the output of NAND gate 50 is a logic 1 which sets flip-flop 52 to indicate that a channel is available for the requested information. If all channels are occupied, the output of the NAND gate 50 is a logic 0 which resets the flip-flop 52, indicating that no channel is available. This information is transmitted back to the subscriber through line 16. This can be by a busy signal or a light at the subscriber station indicating that the information should be requested at a later time. Of course, it is possible to provide circuitry for allowing the control unit 14 to remember request and provide the request upon availability of a channel in the information transmitting system; however, the time for response may be lengthy. This would occupy the receiver 20 for a prolonged time awaiting transmitted information.

Figure 3:
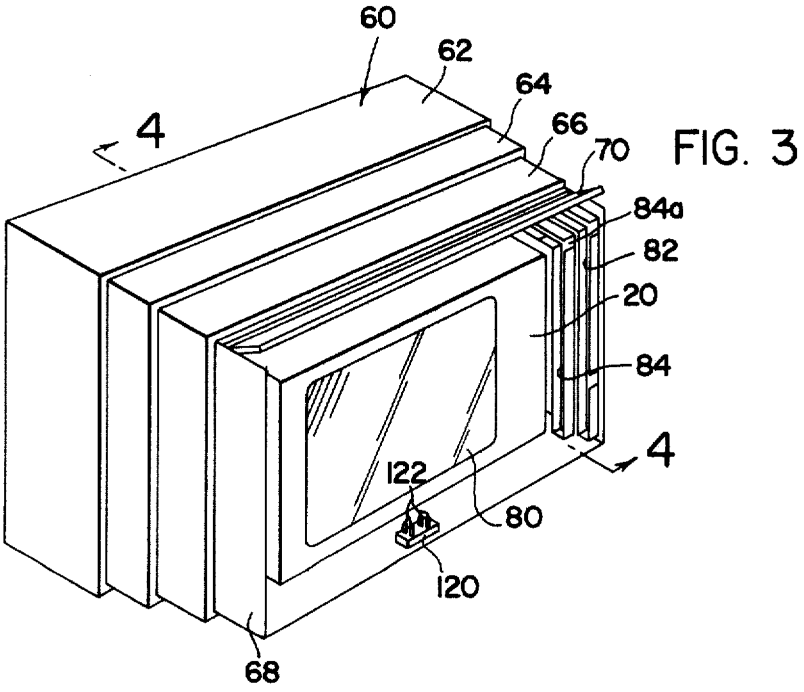
FIG. 3 is a pictorial view illustrating general appearance of the housing employed in accordance with the preferred embodiment of the present invention.
Figure 4:
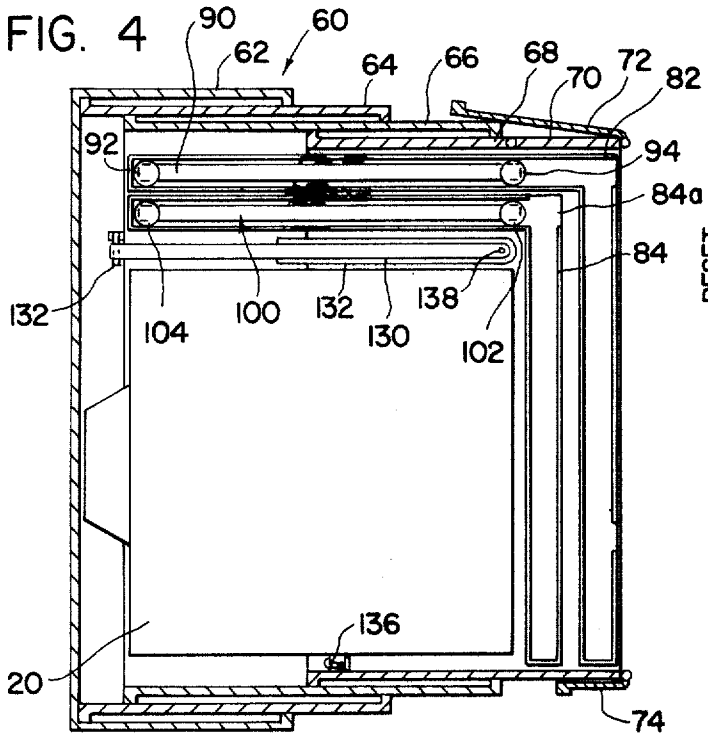
FIG. 4 is a cross-sectional view taken generally along line 4—4 of FIG. 3.
Figures 8, 9, 10:
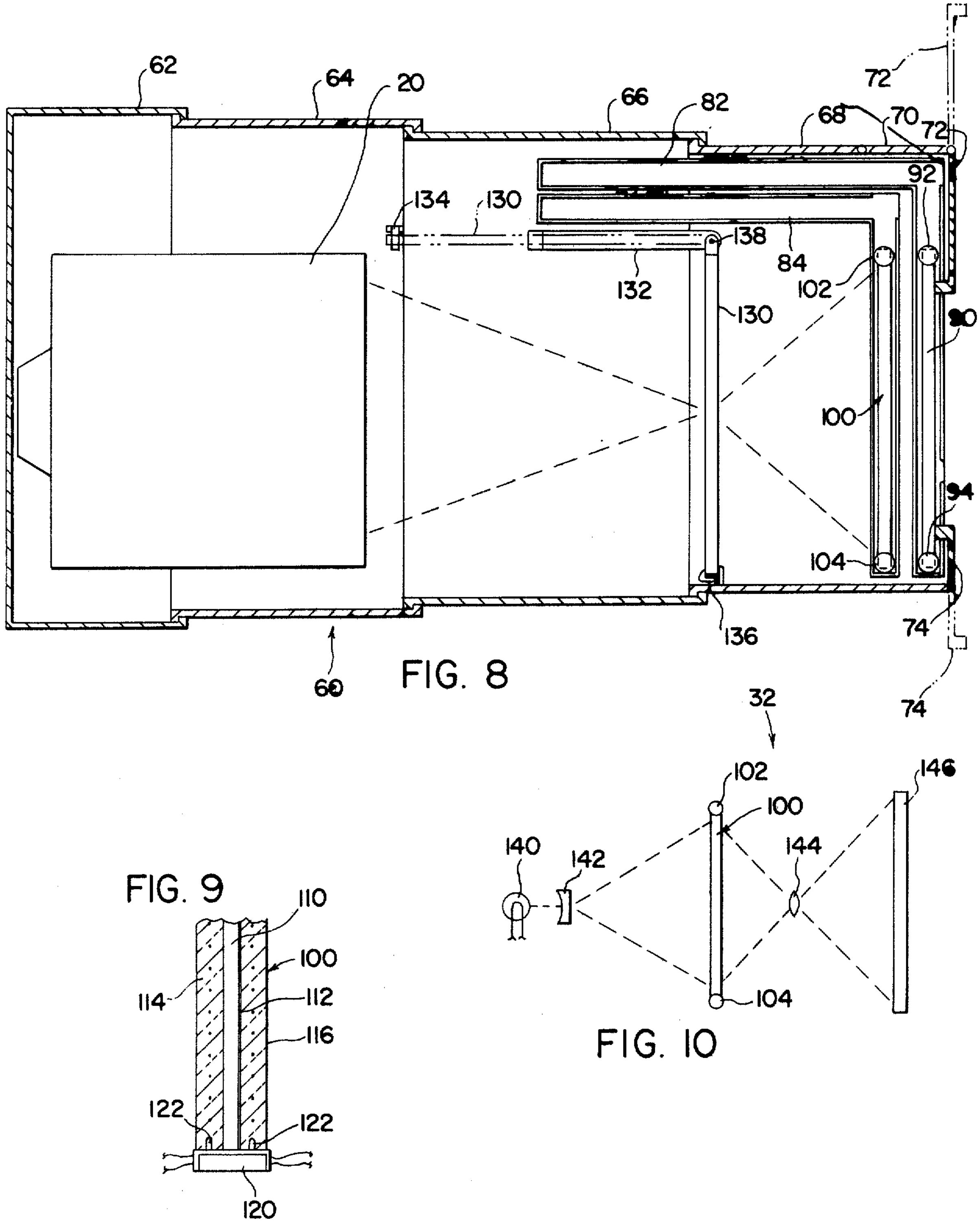
FIG. 9 is a partial, enlarged cross-sectional view showing, schematically, the image storing plate of the preferred embodiment of the present invention; and, FIG. 10 is a simplified object diagram for projecting the image stored on the image storing plate to a screen.

Referring now to FIGS. 3 and 4, one structure adapted to be used at the subscriber television receiver 20 to practice the present invention is illustrated as including a telescoping housing 60 generally surrounding the receiver 20 and including sections 62, 64, 66 and 68 which may be shifted from the retracted position shown in FIGS. 3 and 4 for normal use of receiver 20 to an extended position shown in FIG. 8. Section 68 includes a pivotally movable top flap 70. This flap supports an upper light sealing flap 72. A lower light sealing flap 74 combines with the upper sealing flap for the purpose of limiting the amount of light entering the housing 60 when the housing is in the extended position shown in FIG. 8. The image displaying surface 80 of receiver 20 is exposed for normal use when the housing 60 is in the retracted normal position shown in FIGS. 3 and 4.

Located within the section 68 of housing 60 are two L-shaped roller tracks or rails 82, 84. A similar set of corresponding tracks are positioned on the opposite side of section 68 to receive rollers. This mechanism guides the various elements from their upper storage positions shown in FIG. 4 to their lower active positions shown in FIG. 8. Track 82 supports a flat auxiliary light source 90 having an upper set of rollers 92 and a lower set of rollers 94, only one roller of each set is illustrated. These rollers are received in the track 82 on opposite sides of the housing section 68. In this manner, the auxiliary light source 90 can be moved manually from the position shown in FIG. 4 to the position shown in FIG. 8. The auxiliary light source 90 may take a variety of structural forms; however, generally it includes a rearward opaque wall and a forwardly facing uniform light source. In the position shown in FIG. 8, the light source is directed toward the television receiver 20, for a purpose to be explained later. In some instances, the light source may not be needed; therefore, only an opaque structure is carried by the rails 82 between the storage and active positions. In the position of FIG. 8, the sealing flaps 72, 74 are pivoted into the positions shown, which coacts with the light source 90 to substantially close the inner chamber of housing 60 from external, random light.

Figure 5:
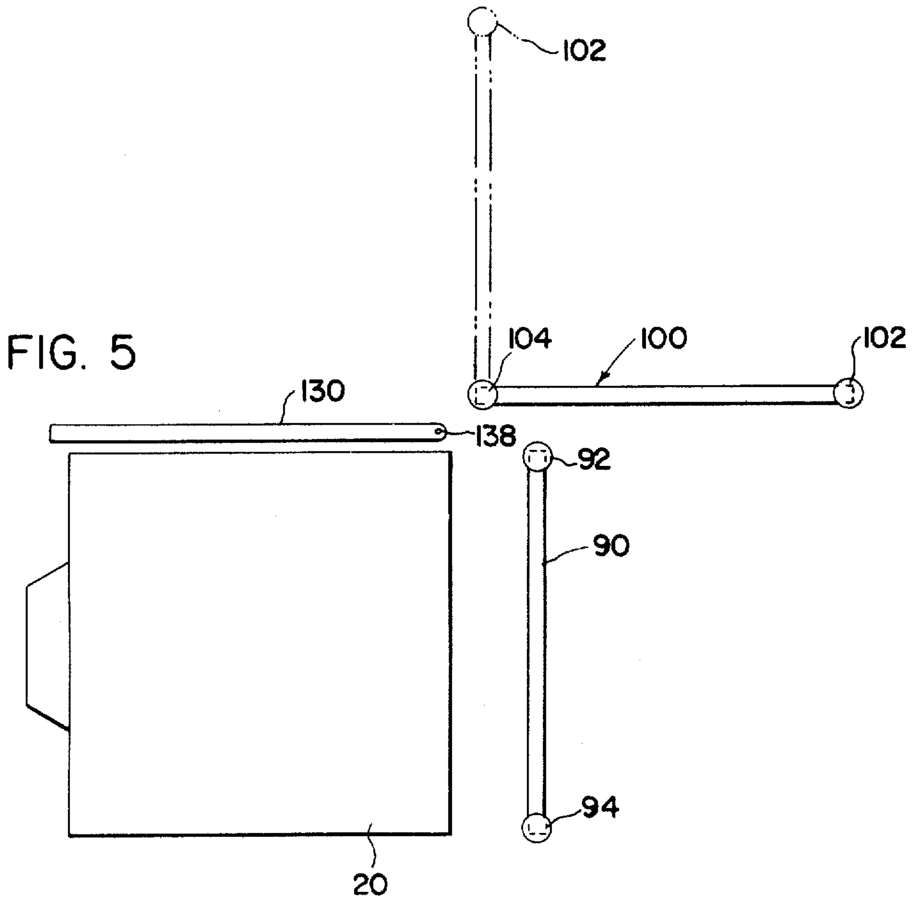
FIGS. 5, 6, 7 and 8 are schematic diagrams illustrating certain operating positions of the housing and components therein used in the preferred embodiment of the present invention.
Figure 6:
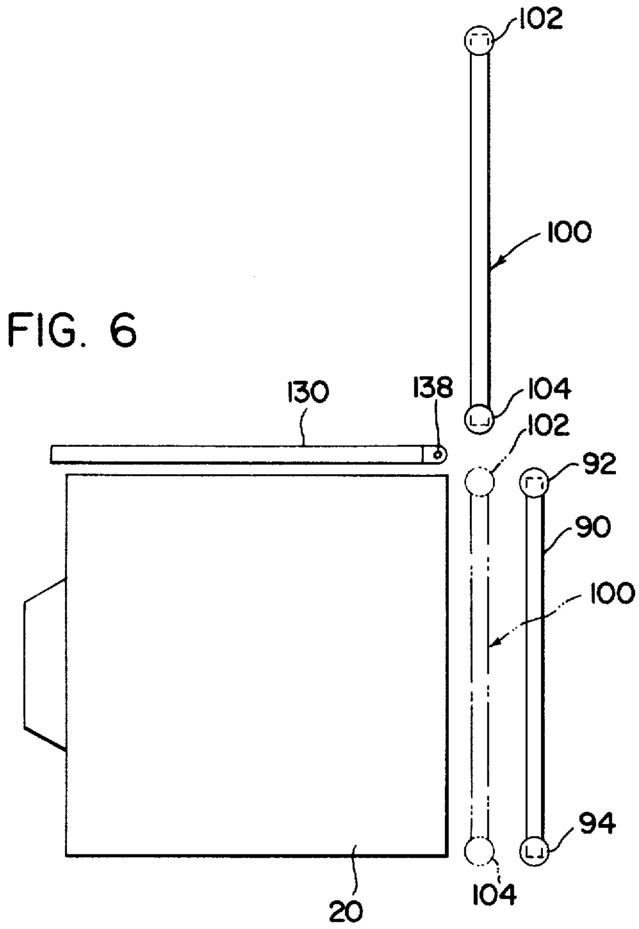
Figure 7:
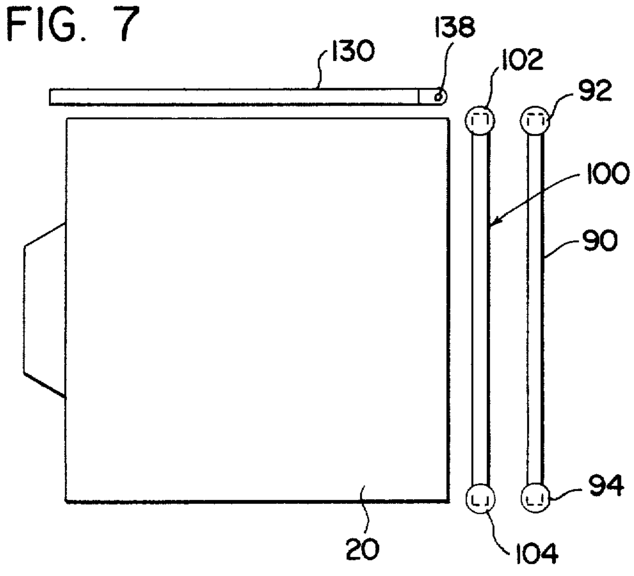

A static image on surface 80 is transmitted and stored within the image storage plate 100, the details of which have been previously described. This plate has an upper set of rollers 102 and a lower set of rollers 104 which coact with spaced L-shaped rails 84, so that the image storing plate may be moved as shown in FIGS. 5, 6 and 7 to position the plate in front of the surface 80 of receiver 20. The rails or tracks 84 extend inwardly of the rails or tracks 82, as best shown in FIG. 3, so that the plate 100 may be moved outwardly, pivoted upwardly and then shifted downwardly. During this motion, rollers 102 move from the rails. They are again inserted into the lower legs of the rails, as illustrated in FIG. 8.

Referring more specifically to FIG. 9, the image storage plate includes a PLZT ceramic layer 110 which is capable of receiving and storing the image from surface 80 in a manner previously described. A photoconductive layer 112 is coated onto one surface of layer 110, and the structure is sandwiched between electrodes 114, 116. These electrodes are such that they create an electro-magnetic field within the ceramic layer 110 when a voltage is applied thereacross. Of course, these electrodes must have a structure for distributing the flux field over the total surface of the layer. The electrodes are known which can accomplish this purpose; however, the electrodes illustrated in FIG. 9 include a series of internal wires for assisting in the distribution of a flux field between the electrodes. If such wires were used, they should be designed to minimize the effect upon the stored image. A socket 120 supported on the lower surface of telescoping section 68 includes four prongs 122, two of which are adapted to be received in each of the electrodes for creating a voltage potential between the electrodes. The polarity of the voltage of the electrodes may be changed by using a different set of the prongs 120 which are received within the electrodes 114, 116 when the image plate 100 is in the position shown in FIG. 8.

To focus the image from surface 80 to the image storage plate 100, the lens plate 130 is supported by plates 132, only one of which is shown. These plates are supported on the opposite side of the inner telescoping section 66 and are spaced inwardly therefrom to allow for retraction of outer section 68. Latches 134 are adapted to engage the opposite edges of lens plate 130 to hold the lens plate in the remote position, as shown in FIG. 4. Latches 136 hold the lens plate in the lower position, as shown in FIG. 8. Pivot pins 138 allow for the shifting of the lens plate. The latches are provided with appropriate operating devices external of the housing. These are not shown since they do not form a part of the present invention. In like manner, external mechanism can be used to shift the lens plate 130 from its upper position to its lower position. Of course, the various plates and components could be mounted on the side of the receiver, instead of the top, as illustrated in the figures, and other structures could be used for moving the various components from their storage position to their operative position. Indeed, plates could be stored in a remote position and inserted into the desired position shown in FIG. 8, when an image is to be stored on the image storing plate 100.

In operation, during normal viewing of the television receiver, the components previously described are stored as shown in FIGS. 3 and 4. If an image is to be recorded on the ceramic image storage plate 100, an auxiliary light source 90 is shifted on rollers 92, 94 from an upper position to a lower position. This is shown in FIG. 5. Thereafter, the image storage plate 100 is moved outwardly with rollers 102 passing through front openings 84*a* into the position shown in solid lines in FIG. 5. This leaves the rollers 104 still in the lower tracks or rails 84. Thereafter, the storage plate is pivoted upwardly as shown in phantom lines in FIG. 5 and in solid lines in FIG. 6. The image plate is then shifted downwardly into the phantom line position of FIG. 6. This is the solid line position of plate 100 in FIG. 7. To allow for upward movement of the plate 100, top flap 70 is pivoted upwardly. The telescoping sections 62–68 are then moved outwardly as shown in FIG. 8. Latches 134 are released and the lens plate 130 is pivoted downwardly into the solid line position shown in FIG. 8. The downward movement of image plate 100 engages the electrodes 114, 116 with the prongs 122 of socket 120 on the lower edge of the telescoping section 68. By closing the light sealing flaps 72, 74 the device is prepared for operation to store the image from the surface 80 into the ceramic plate 100.

When the components are in the position as shown in FIG. 8, the unit is then in condition to receive a static image appearing upon the surface 80 of receiver 20. The electrodes 114, 116 are energized by a voltage applied at plug 120 to produce a pre-polarizing field within the ceramic layer 110. When this pre-polarizing field is created, auxiliary light source 90 exposes the ceramic layer 110 to a uniform light field. This uniform light field erases all variations in domain orientation within the ceramic plate 110 to remove any previously stored image. After this prepolarization has taken place, the light source 90 is deactivated. Thereafter, the image is caused to appear upon receiver 20 and is focused by lens plate 130 onto the photoconductive layer 112, as shown in the dashed lines of FIG. 8. While the ceramic layer and photoconductive film are exposed to the image, the electrodes 114, 116 are subjected to a voltage having the same polarity as previously used for prepolarization by the auxiliary light source 90. In this manner, the image is recorded within the ceramic layer 110. After sufficient time to record the image and orient the domains in accordance with this image, the plate 100 is removed from housing 60 by shifting the flaps 72, 80 upwardly. The plate 100 now contains the image; therefore, the image need not be retained on the surface 80 of receiver 20. Thereafter, the various components are manually shifted into the remote storage position as shown in FIGS. 3 and 4. The plate 100 contains the image and may be viewed externally by a projector system 32. The schematic representation of such a projector is illustrated in FIG. 10 wherein a light source 140 is directed to the screen through a lens 142. A lens 144 then focuses the image from plate 100 onto a screen 146. This schematic view is intended only to show that a projector can be used to view the information or image stored upon flat plate 100. Of course, various external viewing systems could be used when plate 100 is removed from housing 60. Also, it is possible to view the image stored on the plate 100 by the light of the receiver 20. This can be done by shifting the auxiliary light source 90 upwardly into its retracted, stored location and adjusting the television receiver 20 to a channel not being used.

Also, if no auxiliary light source is to be used, the light source then becomes only an opaque screen or shield for closing the front opening of housing 60 in the position shown in FIG. 8. Thereafter, the plate 100 may be prepolarized by placing a reverse voltage across the electrodes 114, 116 and exposing the screen to a solid light from the image displaying surface 80 of receiver 20. Consequently, there are two ways of pre-polarizing the plate 100 to remove or erase previously stored images.

Figure 2:
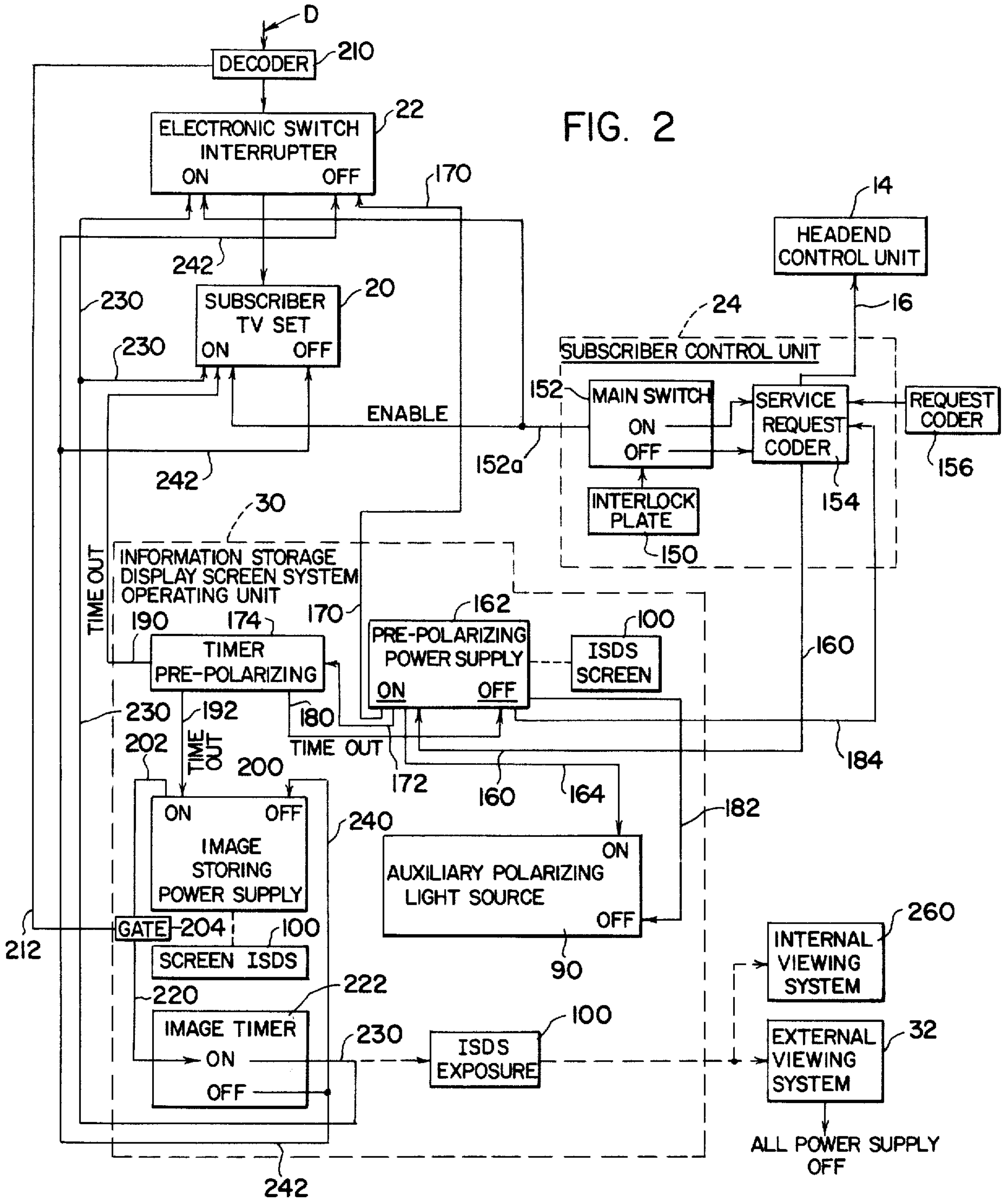
FIG. 2 is a more detailed block diagram illustrating certain components and functions of the preferred embodiment of the present invention.

Referring now to FIG. 2, there is illustrated a combined flow and system diagram for operation of the system in accordance with the preferred embodiment of the present invention. An interlock 150 is activated whenever the components are in the position shown in FIG. 8 and are ready for operation of the image storage and display function of the invention. After the interlock has been activated, the main switch 152 can be manually turned on. The receiver is shifted to the information receiving channel. Line 152*a* then enables both the television receiver 20 and the electronic switch interrupter 22 for operation as explained later. In addition, the main switch activates the service request coder 154 which does not send information on line 116 until further enabling has taken place. The information requested is provided by the request coder 156 which directs the information to the service request coder 154. This request coder 156 may be manually adjusted to the requested information, i.e., the requested image, desired for storage on the flat plate 100. When the service request coder 154 is first energized, line 160 activates the prepolarizing power supply 162. This immediately turns on the auxiliary polarizing light source 90 by line 164. At the same time, line 170 turns off switch 22. This prevents an image signal from appearing on surface 80 while plate 100 is being pre-polarized. No signal can be transmitted through this switch on the information channel at this particular stage of the operating system. Line 172 is actuated when the power supply 162 has been turned on. This starts the prepolarizing timer 174. This timer provides sufficient time for prepolarizing the ceramic plate 100 by the auxiliary polarizing light source 90. It is noted that the pre-polarizing power supply is connected to the screen 100 to provide a voltage across the electrodes 114, 116. Consequently, while timer 174 is timing, the plate 100 is subjected to a uniform light source and an electromagnetic field across the electrodes. This erases any previous image, as discussed earlier. After this pre-polarization has taken place, timer 174 times out. Line 180 then turns off the pre-polarizing power source 162 to remove the voltage across the electrodes of plate 100. Line 182 then turns off the auxiliary polarizing light source 90. At the same time, when the pre-polarizing power supply has been turned off indicating that the system is ready to receive an image, a signal is sent through line 184 to the service request coder 154. This activates the coder to send the information requested by request coder 156 and customer code through line 16 to the head end show unit 14, as previously described.

Pre-polarizing timer 174, when timed out also actuates line 190 which turns on the subscriber television receiver 20 which is enabled by line 152*a* of the main switch 152. At the same time, timer 174 actuates an image storing power supply 200 by line 192. This places a voltage across the electodes 114, 116 of the storage screen 100 as indicated by the dotted lines. However the switch 22 has not yet been turned on to transmit a signal on the information channel; therefore, no image appears on the subscriber receiver. In this manner, a false image is not exposed to the image plate 100. When the power supply 200 is turned on, line 202 is actuated which is connected to gate 204. If the gate is not opened, nothing happens. This gate is controlled by the decoder 210 in response to receipt of the customer code in cable D. A signal is then received through line 212 to open gate 204. This allows line 220 to start image timer 222.

Figure 2B:
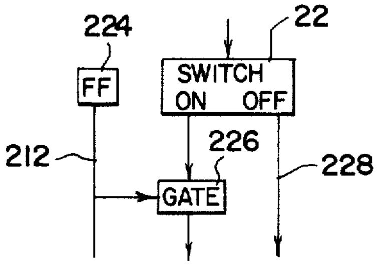
FIG. 2B is a simplified logic diagram illustrating another aspect of the preferred embodiment of the invention.
Figure 2A:
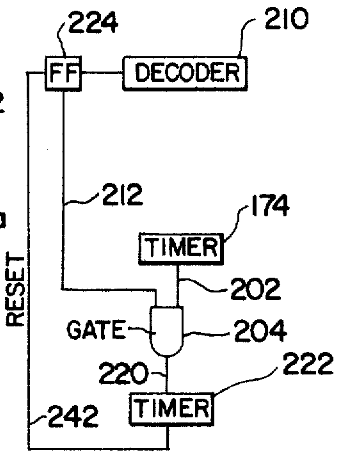
FIG. 2A is a simplified logic diagram illustrating an aspect of the preferred embodiment shown in FIG. 2.

A circuit for operating gate 204 is schematically illustrated in FIG. 2A wherein a flip-flop 224 is set by decoder 210 upon receipt of the customer code. This immediately applies a logic 1 to gate 204, which is shown as a AND gate. Logic 1 from timer 174 through line 202 causes a signal in line 220 which starts timer 222. The decoder 210 after releasing gate 204 by receiving the customer code then passes the image signal to switch 22. At this time, a gate 226, shown in FIG. 2B, may be used. A signal in line 212, indicating that the proper customer code has been received, opens gate 226 allowing passage of the signal on cable D to receiver 20. When switch 22 is off, the signal from cable D may pass directly to the receiver 20 through a path schematically represented as line 228 representing a normal operating condition of the receiver when no information is being requested. Gate 226 allows passage of only the information preceded by the proper customer code. Other signals, even on the information channel selected at receiver 20, does not pass gate 226. Of course, the function of gate 226 of allowing transmission of only a requested image to the receiver could be accomplished by other structure.

Line 230 of timer 222 is actuated by this timer to turn on switch 22 and assure that the television receiver 20 is on to receive the image information. Consequently, the decoder 210 allows the signal to pass through the switch 22 into the receiver 20. Requested image is then displayed on the image surface 80 of the receiver 20. This image is focused onto plate 100 while the power supply 200 applies a voltage to the electrode of the plate. In this manner, the image on surface 80 is stored within the plate 100. After a sufficient time, in the range of approximately 30–60 seconds, timer 222 times out. This activates line 240 to turn off the power supply 200. Also, line 242 turns off switch 22 and the television receiver 20. The image storing function has now been completed. Line 242 could also be used to reset the flip-flop 224, as shown in FIG. 2A. Switch 152 is then turned off and the system can now operate in accordance with normal procedure. The schematically illustrated components in FIG. 2 can take various forms. It is understood that in the system an ON signal or an OFF signal overrides a prior inconsistent condition of a component. For instance, when switch 22 is off, an ON signal turns it on even though the signal creating the OFF condition has not been specifically removed. This is standard practice in a system flow chart of the type illustrated in FIG. 2. Of course, various changes could be made in this system without departing from the intended spirit and scope of the present invention.

The exposed flat plate 100 is schematically illustrated in FIG. 2 as being externally viewed by a system such as system 32 shown in FIG. 10. The internal reviewing system 260, as previously discussed, involved only inserting the plate 100 for viewing by the uniform light of the television receiver.

Having thus defined by invention, I claim:

1. A device for storing for subsequent visual display a static image displayed on the image surface of a television tube receiving static information from the head end of a cable television network, said image surface facing in a given direction along a general line of sight, said device comprising: a movable housing selectively movable between a first position wherein said image surface can be viewed along said line of sight and a second position wherein said housing defines an enclosed chamber exposed to said image surface and extending outwardly from said image surface along said line of sight; a generally flat plate carried by said housing and formed from a layer of ceramic material capable of forming a visually displayable image when concurrently exposed to an electro-magnetic field and a light image and means formed with said layer for selectively creating said electro-magnetic field; means for allowing removal of said flat plate from said housing after said displayable image has been created therein, whereby said displayable image may be viewed remotely of said housing; means in said housing for shifting said plate between a remote storage position out of said line of sight when said housing is in said first position whereby said image surface can be viewed with said housing in said first position and a position aligned with and generally parallel to said image surface when said housing is in said second position; a lens; means in said housing for selectively positioning said lens between a location with said lens outside said line of sight and a location in said line of sight between said image surface and said plate to focus said static image onto said flat plate when said plate is in said aligned position; and, power means for energizing said field creating means while said image is focused onto said layer whereby said static image is stored in said flat plate.

2. A device as defined in claim 1 wherein said ceramic layer is a layer of PLZT ceramic and including a photoconductive film coextensive with said ceramic layer.

3. A device as defined in claim 1 wherein said housing includes at least two telescoping sections and said first position is a retracted position of said sections and said second position is an extended position of said sections.

4. A device as defined in claim 1 including means for allowing removal of said flat plate from said housing.

5. A device as defined in claim 1 wherein said power means includes a socket means secured to said housing and positioned to receive said flat plate when said flat plate is in said aligned position.

6. A device as defined in claim 1 wherein said lens is supported upon a member and said positioning means includes means for allowing pivotal movement of said member between a first position remote to said lens location and a second position at said lens location.

7. A device for storing for subsequent visual display a static image displayed on the image surface of a television tube receiving static information from a cable television network, said image surface facing in a given direction along a general line of sight, said device comprising a housing defining a chamber exposed to said image surface; a generally flat plate carried by said housing and formed from a layer of PLZT ceramic, a coterminous photoconductive layer and at least one generally flat electrode; means in said housing for shifting said plate from a remote storage position out of said line of sight to a position in said line of sight and aligned with said image surface; a lens; means in said housing for selectively positioning said lens between a location with said lens outside said line of sight and a location in said line of sight and between said image surface and said plate to focus said static image onto said photoconductive layer; means for applying a biasing voltage to said electrode whereby said static image is stored in said ceramic layer and, means for allowing removal of said flat plate from said housing after said static image has been stored therein, whereby said static image may be viewed remotely of said housing.

8. A cable television system for storing for subsequent visual display a static image on the image surface of a television tube connected to a cable television network onto a generally flat plate formed from a layer of ceramic material capable of forming a visually displayable image when concurrently exposed to an electro-magnetic field and a light image, said system comprising:

a. means for positioning said plate in a position exposed to the image surface of a television tube receiving a static image from a cable television network;
b. means for exposing said flat plate to a generally uniform light source while concurrently subjected to an electro-magnetic field;
c. means for creating a selected image on said image surface for at least a given time;
d. means for subjecting said flat plate to an electro-magnetic field while exposed to said selected image;
e. first timing means for controlling the time said flat plate is concurrently exposed to said uniform light source and said electro-magnetic field; and,
f. means for allowing removal of said plate from its exposed position whereby said selected image may be viewed independent of said television tube.

9. A system as defined in claim 8 including:

f. second timing means for controlling the time said plate is subjected concurrently to said selected image and an electro-magnetic field.

10. A cable television system for storing for subsequent visual display a static image onto a generally flat plate formed from a layer of ceramic material capable of forming a visually displayable image when concurrently exposed to an electro-magnetic field and a light image, said system comprising:

a. means for positioning said plate in a position exposed to the image surface of a television tube receiving said image from a cable television network having a head end;
b. means for exposing said flat plate to a generally uniform light source while concurrently subjected to an electro-magnetic field;
c. means for creating on said image surface for at least a given time an image selected at and transmitted from said head end;
d. means for subjecting said flat plate to an electro-magnetic field while exposed to said selected image;
e. timing means for controlling the time said flat plate is subjected concurrently to said selected image and an electro-magnetic field; and,
f. means for allowing removal of said plate from its exposed position whereby said selected image may be viewed independent of said television tube.

11. A system as defined in claim 10 including:

f. means for inhibiting said timing means until said image is displayed on said image surface.

12. A cable television system for storing for subsequent visual display a static image onto a generally flat plate formed from a layer of ceramic material capable of forming a visually displayable image when concurrently exposed to an electro-magnetic field and a light image, said system comprising:

a. means for positioning said plate in a position exposed to the image surface of a television tube receiving a static image from a cable television network;
b. means for exposing said flat plate to a generally uniform light source while concurrently subjected to an electro-magnetic field;
c. means for creating a selected image on said image surface for at least a given time;
d. means for subjecting said flat plate to an electro-magnetic field while exposed to said selected image;
e. means for requesting a particular selected image;
f. means responsive to said requesting means for displaying said requested selected image on said image surface; and,
g. means for allowing removal of said plate from its exposed position whereby said selected image may be viewed independent of said television tube.

13. A system for storing for subsequent visual display a static image onto a generally flat plate formed from a layer of ceramic material capable of forming a visually displayable image when concurrently exposed to an electro-magnetic field and a light image, said system comprising:

a. means for positioning said plate in a position exposed to the image surface of a television tube;
b. means for exposing said flat plate to a generally uniform light source while concurrently subjected to an electro-magnetic field;
c. a cable television network including a head end and means at said head end for creating a selected image on said image surface for at least a given time;
d. means for subjecting said flat plate to an electro-magnetic field while exposed to said selected image;
e. means for creating a customer code and a requested information code;
f. means for communicating said customer and requested information codes to said head end;
g. means at said head end for decoding said codes;
h. means at said head end for transmitting said requested information and a customer code to a position adjacent said television tube;
i. decoding means for decoding said customer code;
j. means associated with said television tube to provide a code corresponding to said tube;
k. control means for directing said requested information to said television code when said customer code matches said tube corresponding code; and,
l. means for allowing removal of said plate from its exposed position whereby said selected image may be viewed independent of said television tube.

14. A method for storing for subsequent visual display a static image onto a generally flat plate formed from a layer of ceramic material capable of forming a visually displayable image when concurrently exposed to an electro-magnetic field and a light image, said method comprising the steps of:

a. positioning said plate in a position exposed to the image surface of a television tube connected by a cable to the head end of a cable television system;

b. exposing said flat plate to a generally uniform light source while concurrently subjected to an electro-magnetic field;

c. creating a selected image on said image surface for at least a given time and from said head end of a cable television network;

d. subjecting said flat plate to an electro-magnetic field while exposed to said selected image;

e. controlling the minimum time said flat plate is concurrently exposed to said uniform light source and said electro-magnetic field; and, f. removing said flat plate from said exposed position for subsequent viewing independent of said television tube.

15. A method for storing for subsequent visual display a static image onto a generally flat plate formed from a layer of ceramic material capable of forming a visually displayable image when concurrently exposed to an electro-magnetic field and a light image, said method comprising the steps of:

a. positioning said plate in a position exposed to the image surface of a television tube connected by cable to the head end of a cable television network;

b. exposing said flat plate to a generally uniform light source while concurrently subjected to an electro-mgnetic field;

c. creating a selected image on said image surface for at least a given time and from said head end of a cable television network;

d. subjecting said flat plate to an electro-magnetic field while exposed to said selected image;

e. controlling the minimum time said flat plate is subjected concurrently to said selected image and an electro-magnetic field; and, f. removing said flat plate from said exposed position for subsequent viewing independent of said television tube.

16. A method for storing for subsequent visual display a static image onto a generally flat plate formed from a layer of ceramic material capable of forming a visually displayable image when concurrently exposed to an electro-magnetic field and a light image, said method comprising the steps of:

a. positioning said plate in a position exposed to the image surface of a television tube connected by a cable to the head end of a cable television system;

b. exposing said flat plate to a generally uniform light source while concurrently subjected to an electro-magnetic field;

c. creating a selected image on said image surface for at least a given time and from said head end of a television network;

d. subjecting said flat plate to an electro-magnetic field while exposed to said selected image;

e. creating adjacent said television tube a customer code and a requested information code;

f. communicating said customer and requested information codes to said head end;

g. decoding said codes at said head end;

h. transmitting said requested information and a customer code from said head end to a position adjacent said television tube;

i. decoding means adjacent said television tube for decoding said customer code;

j. means for providing a code at said television tube corresponding to said tube;

k. directing said requested information to said television code when said customer code matches said tube corresponding code; and, l. removing said flat plate from said exposed position for subsequent viewing independent of said television tube.

* * * * *